US008956507B2

(12) United States Patent
Olejar

(10) Patent No.: US 8,956,507 B2
(45) Date of Patent: Feb. 17, 2015

(54) HIGH EFFICIENCY APPARATUS FOR LIQUID SMOKE GENERATION FROM WOOD

(76) Inventor: Slavomir Olejar, St. Catharines (CA)

(*) Notice: Subject to any disclaimer, the term of this patent is extended or adjusted under 35 U.S.C. 154(b) by 639 days.

(21) Appl. No.: 13/025,480

(22) Filed: Feb. 11, 2011

(65) Prior Publication Data

US 2012/0207898 A1   Aug. 16, 2012

(51) Int. Cl.
*C10B 27/04* (2006.01)
*A23L 1/22* (2006.01)
*A23B 4/052* (2006.01)

(52) U.S. Cl.
CPC .................................. *A23B 4/0526* (2013.01)
USPC ........... 202/263; 426/534; 426/474; 426/475; 99/323.1

(58) Field of Classification Search
USPC ............ 202/96, 117, 217, 227, 263; 426/650, 426/442, 474, 475
See application file for complete search history.

(56) References Cited

U.S. PATENT DOCUMENTS

| | | | | | |
|---|---|---|---|---|---|
| 4,298,435 | A | * | 11/1981 | Ledford | 201/8 |
| 4,540,613 | A | * | 9/1985 | Nicholson et al. | 428/34.8 |
| 4,994,297 | A | * | 2/1991 | Underwood et al. | 426/650 |
| 5,039,537 | A | * | 8/1991 | Underwood | 426/271 |
| 5,135,770 | A | * | 8/1992 | Underwood | 426/650 |
| 5,292,541 | A | * | 3/1994 | Underwood et al. | 426/250 |
| 5,397,582 | A | * | 3/1995 | Underwood et al. | 426/250 |
| 5,681,603 | A | * | 10/1997 | Underwood | 426/271 |
| 6,214,395 | B1 | * | 4/2001 | Moeller et al. | 426/314 |
| 7,758,907 | B2 | * | 7/2010 | Holzschuh et al. | 426/650 |
| 2004/0096568 | A1 | * | 5/2004 | Holzschuh et al. | 426/650 |

* cited by examiner

*Primary Examiner* — Nina Bhat

(57) ABSTRACT

This invention relates to a high efficiency apparatus for manufacturing an aqueous wood smoke solution in the form of a liquid smoke desired concentration by burning wood, wooden chips or sawdust in a limited amount of air. Wood consumption per unit of liquid smoke is significantly smaller comparing to conventional methods, while the air pollution is reduced to a negligible level.

3 Claims, 2 Drawing Sheets

HIGH EFFICIENCY APPARATUS AND METHOD FOR LIQUID SMOKE GENERATION

HIGH EFFICIENCY APPARATUS AND METHOD FOR LIQUID SMOKE GENERATION

HIGH EFFICIENCY APPARATUS AND METHOD FOR LIQUID SMOKE

GENERATION

HIGH EFFICIENCY APPARATUS FOR LIQUID SMOKE GENERATION FROM WOOD

BACKGROUND OF THE INVENTION

Smoking meat as a way of preservation and its flavor enrichment has been known for centuries.

The usual method was to place the meat to be smoked into a smoke produced by burning or smoldering coal, wood, wooden chips, or sawdust. Such process would last for several hours or even days before a sufficient amount of smoke particles were deposited on the surface of the object to be smoked. Undeposited smoke would then be freely released into the atmosphere contributing to overall air pollution. The efficiency of capturing and applying smoke using such a method was very low since most of the generated smoke would be released into the air. Better efficiency was achieved by obtaining so called liquid smoke in a process comprised of burning wood and mixing the smoke with counter streaming water or steam. Such method is disclosed in U.S. Pat. No. 3,106,473 |(Aqueous Smoke Solution For Use In Food—Hollenbeck). Other methods include burning of sawdust and condensing the products of such combustion as described in the U.S. Pat. No. 4,883,676 (Method of forming liquid smoke—Spyros Sophianopoulos et al). The yield of liquid smoke as referred in U.S. Pat. No. 3,106,473 is 100 ml from 10 g of maple sawdust (wood consumption ratio 0.1 g/ml), and can be considered as the common yield.

Compared to the older methods, less smoke is released into the atmosphere during referenced processes. Still, air pollution could be significant, while the yield of liquid smoke is lower than possible.

A similar principle to the one disclosed in this invention is described in U.S. Pat. No. 3,480,466 (Preparation and Use of a Smoke-flavored Edible Oil).

BRIEF SUMMARY OF THE INVENTION

This invention relates to high efficiency apparatus for manufacturing an aqueous wood smoke solution in form of liquid smoke, and describes examples of obtaining such aqueous solution using variants of the same apparatus by burning wood, wooden chips or sawdust in a limited amount of air.

The apparatus proposed herein, improves deficiencies regarding air-pollution and obtains a better liquid smoke yield per unit of combustible materials. The liquid smoke can be conveniently produced without smoke loss and better yield in the proposed system, which is comprised of an incinerator partially filled with wood, wooden chips or sawdust, water tank, and a smoke conveying device, mutually connected with pipes in a closed circuit.

Smoke conveying device has IN and OUT ports. Certain low pressure is created at the IN port while higher pressure is created at the OUT port. The IN port is connected with the water tank, which is filled with the water approximately ¾ of its volume having an air chamber in its remaining upper part. The upper part of the water tank is connected to the IN port and is under low pressure. The OUT port is connected with the incinerator creating higher pressure inside the incinerator.

The incinerator is connected with the water tank, and smoke created in the incinerator by burning wood is under pressure transported through a pipe at the bottom of the water tank. Smoke is then forced through the water in the water tank because of the higher pressure within the pipe, and the lower pressure in the upper part of the water tank. The smoke travels upward mixing with the water. Any smoke that does not mix with the water is then captured in the pipe connected to the IN port of the smoke conveying device. The residual smoke is transported through the OUT port back to the bottom of incinerator where it is added to the generated smoke, and re-circulated back to the water tank. The pressure difference at the IN and OUT ports helps the smoke circulation through the system until liquid smoke of desired quality is obtained. The system is hermetically sealed, so no air-pollution or smoke loss occurs. It was noticed that tar is deposited on the water-tank walls due to the coagulation and flocculation processes that occur during the forced smoke bubbling through the water. The whole process can be repeated using the same batch of liquid smoke and incinerating the new charge of wood, wooden chips or sawdust thus increasing the smoke concentration in the liquid smoke.

DETAILED DESCRIPTION OF THE INVENTION

Figure 1:
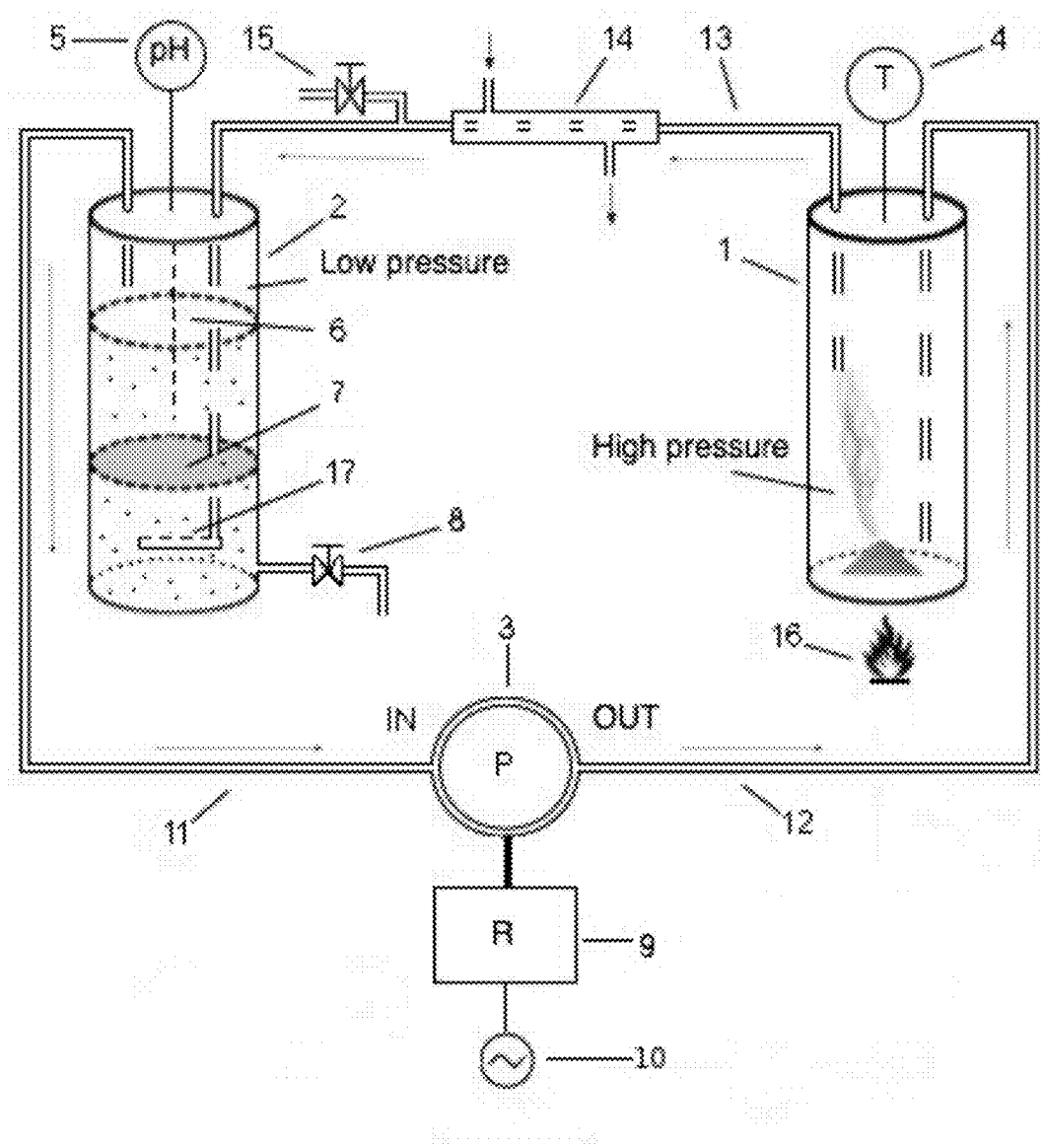
FIG. 1 a schematic presentation of the apparatus according to the invention
Figure 2:
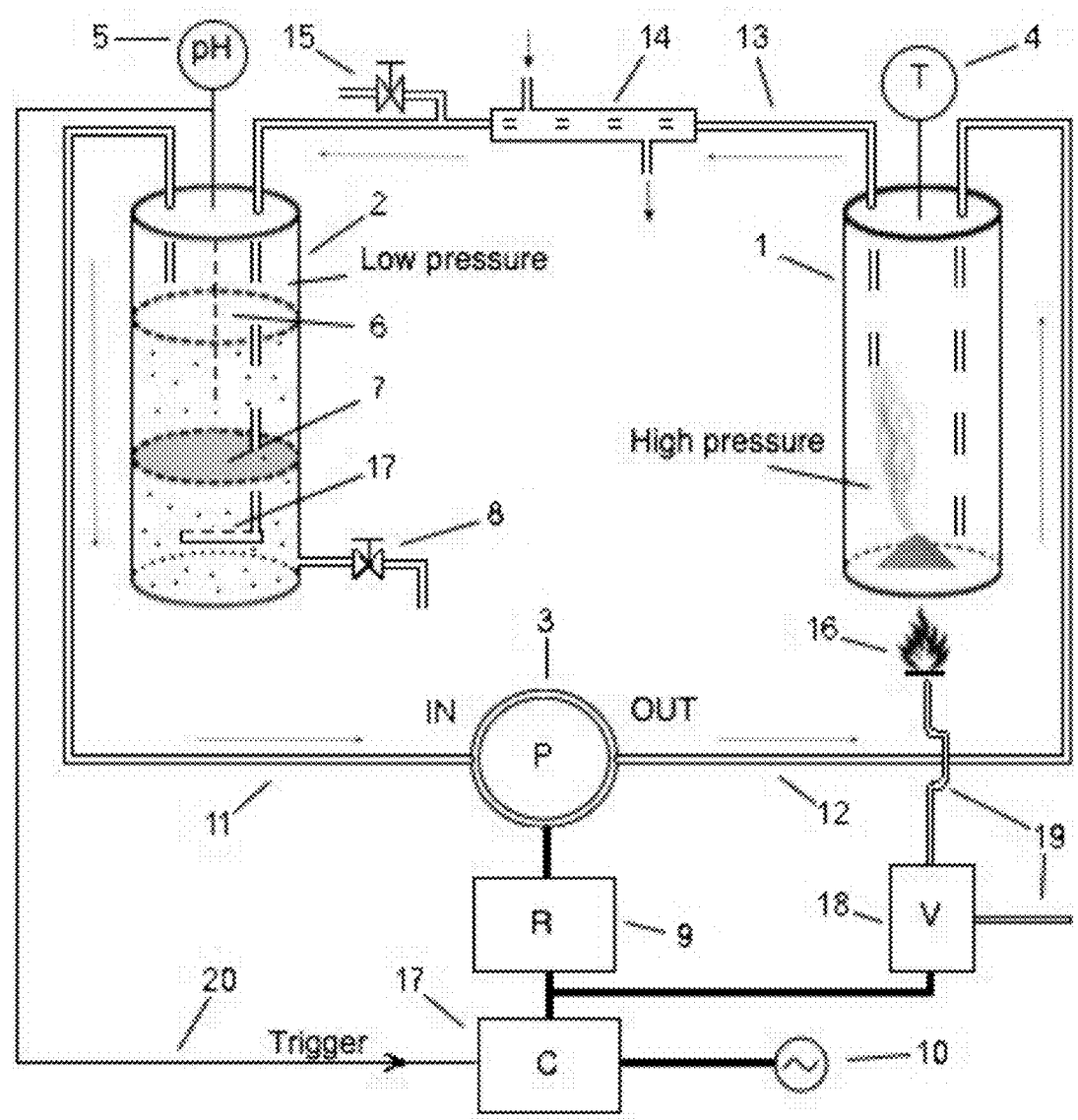
FIG. 2 another embodiment of the apparatus according to the invention

The process and apparatus disclosed in this invention will be further discussed in conjunction with the attached drawings (FIG. 1 and FIG. 2).

The apparatus is comprised of the following major parts including: an incinerator (1) where sawdust, wooden chips or wood is burned in a limited amount of air, a water tank (2) where smoke from the incinerator is mixed with the water, and smoke conveying device P (3) which creates low and high pressure, enabling circular smoke flow within the system.

All major parts are connected with pipes (11, 12, and 13) through which smoke circulates during the process.

Incinerator (1)
is supplied with a thermometer T (4) for maintaining desired burning temperature. The end of pipe (12), which brings residual smoke from the OUT port, is positioned close to the bottom of incinerator.

The end of the pipe (13) is positioned close to the top of incinerator, capturing the smoke and transferring it into the water tank.

The incinerator (1) is hermetically sealed during the process, and incineration with limited air is achieved using an external burner (16).

Water Tank (2)
is supplied with a pH meter (5) immersed into liquid smoke for its pH value control, for maintaining the uniform quality of liquid smoke from one batch to another. The pipe (13) goes from the top of the water tank (2) through the mesh (7), and reaches near the bottom of the tank. The pipe (13) has holes at its end portion (17) through which gaseous smoke is released into the water. The mesh (7) is slightly tilted for better efficiency and breaking released gaseous bubbles into the smaller ones, enabling more intimate smoke mixture with the water. The water level (6) is approximately ¾ of total container volume. The bottom of the water tank (1) is equipped with a valve (8) to drain the liquid smoke out for further processing such as filtration, acidity and color adjustment, and storage.

The water tank (2) is hermetically sealed during the process.

Smoke Conveying Device P (3)
is the "heart" of the system. The pressure difference at the IN and OUT ports creates conditions in which the smoke can circulate from the incinerator (1) into the water tank (2) and back from the water tank (2) into the incinerator (1) until the desired liquid smoke properties are reached.

The power supply (10) for the smoke conveying device's motor is passed through the variable speed regulator R (9) which provides a means for maintaining the whole process at the optimum speed. Lower RPM will create lower pressure at the OUT port, and a small vacuum at the IN port. This will in turn slow down the smoke circulation inside the system and reduce smoke flow through the water creating conditions for better smoke particle suspension and dissolution.

Pipes (11, 12, 13) are acid resistant since the smoke that circulates through them is acidic. Pipe (13) is supplied with a cooling system (14) through which cold water runs, helping the smoke condensation and lowering the residual smoke temperature. This helps the smoke to dissolve in the water more effectively.

Valve (15) is a control valve. When there is no smoke getting out of it, the incineration process has finished.

In addition to the existing parts shown in FIG. 1, the system can be equipped with the automation elements shown in FIG. 2.

Controller C (17), that serves as an on/off switch, is connected to the pH meter (5), the electromagnetic valve V (18), and to the variable speed regulator R (9).

Voltage generated in the pH meter (5) is sent over the wire (20), and measured by the controller (17). When the voltage reaches a pre-set level that represents a desired pH value of liquid smoke, the controller C (17) is triggered and turns the power supply (10) off, so the smoke conveying device P (3) stops the smoke circulation and the smoke mixing process as well.

Gas to the burner (16) is supplied through the pipes (19) and the electromagnetic valve V (18) that is normally closed. The valve is opened only while power from the controller C (17) is present. When the liquid smoke solution in the water tank (2) reaches a desired pH value, the controller C (17) turns off the power causing the electromagnetic valve V (18) to close the gas supply to the burner (16).

Shutting down the smoke conveying device P (3), and the electromagnetic valve V (18) causes the whole process to stop.

It is understood that the design of pH meter (5), the electromagnetic valve V (18) and the controller C (17) is outside the scope of this invention.

It is also understood that further automation elements such as automatic maintenance of desired burning temperature in the incinerator (1), and safety measures to ensure tight closure of incinerator (1) and water tank (2), can be added to the models shown in FIG. 1 and FIG. 2. This figures shall be interpreted as illustrative and not in the limiting sense.

Example I 300 grams of apple wood sawdust was placed into the incinerator (1), which was hermetically sealed afterwards. 10 liters of water was poured into the water tank (2), which was also hermetically sealed afterwards.

The GAST diaphragm pump with a variable speed controller R (9) was used as a smoke conveying device P (3).

All elements were connected with pipes according to FIG. 1.

An incineration temperature of 280 C was achieved by external heating using a propane burner.

The process will continue until the combustible material has burned. The process status can be monitored by opening the control valve (15) to check for smoke flow. The obtained liquid smoke had a pH value 6, with the same organoleptic properties as one commercially available on the market.

The yield of liquid smoke using this apparatus was 10,000 ml of liquid smoke from 300 g of apple wood sawdust. The wood consumption ratio 0.03 g/ml was much lower than the common one (0.1 g/ml).

Example II 600 grams apple wood sawdust was placed into the incinerator (1), which was hermetically sealed afterwards. 10 liters of water was poured into the water tank (2), which was also hermetically sealed afterwards.

The Elmo Rietschle regenerative blower (3) with a variable speed controller R (9) was used as a smoke conveying device.

All elements were connected with pipes according to FIG. 1.

An incineration temperature of 280 C was achieved by external heating using a propane burner.

The process will continue until the combustible material has burned. The process status can be monitored by opening the control valve (15) to check for smoke flow. The obtained liquid smoke had a pH value 4.6, with the same organoleptic properties as one commercially available on the market.

The yield of liquid smoke using this apparatus was 10,000 ml of liquid smoke from 600 g of apple wood sawdust. The wood consumption ratio 0.06 g/ml was much lower than the common one (0.1 g/ml).

What is claimed is:

1. An apparatus for manufacturing an aqueous wood smoke solution in the form of liquid smoke comprising an incinerator partially filled with wood, wooden chips or sawdust which generates smoke by incinerating the wood, wooden chips or sawdust in a limited amount of air which is in operative connection with a partially filled water tank and smoke conveying device which are interconnected by pipes creating a sealed system, wherein said smoke is conveyed through a conveying device wherein smoke is forced through a water tank and travels upwardly through the tank mixing with water tank due to a pressure differential within the water tank and the incinerator wherein the water and smoke is conveyed through a pipe and condensed to liquid smoke any residual smoke not mixed with water captured above the water level in the water tank is recirculated back to the incinerator.

2. The apparatus in claim 1 where the water tank is equipped with an immersed passive pH meter for continuous control of the pH level of aqueous solution in the water tank for maintaining the quality of the liquid smoke.

3. The apparatus of claim 1, further comprising controllers and power supplies for controlling the pH meter, incinerator and conveying device.

* * * * *